United States Patent [19]

Brown et al.

[11] Patent Number: 5,264,496

[45] Date of Patent: Nov. 23, 1993

[54] METHOD FOR PREPARING REACTIVE TRIAZINE-CAPPED AROMATIC POLYMERS, AND INTERMEDIATES FOR USE THEREIN

[75] Inventors: Sterling B. Brown, Schenectady; Eric W. Walles, Rensselaer, both of N.Y.

[73] Assignee: General Electric Company, Schenectady, N.Y.

[21] Appl. No.: 941,610

[22] Filed: Sep. 8, 1992

Related U.S. Application Data

[62] Division of Ser. No. 726,104, Jul. 5, 1991, abandoned.

[51] Int. Cl.⁵ .............................................. C08G 65/32
[52] U.S. Cl. ................................. 525/390; 525/333.3; 525/333.6; 525/375; 525/396
[58] Field of Search ..................... 525/390, 396, 333.3, 525/333.6, 375

[56] References Cited

U.S. PATENT DOCUMENTS

| | | |
|---|---|---|
| 4,927,894 | 5/1990 | Brown ................................ 525/390 |
| 5,034,527 | 7/1991 | Brown et al. . |
| 5,115,043 | 5/1992 | Yates, III et al. ................... 525/390 |

FOREIGN PATENT DOCUMENTS 0977589  3/1961  United Kingdom .

Primary Examiner—Harold D. Anderson
Attorney, Agent, or Firm—William H. Pittman

[57] ABSTRACT

Hydroxy group-containing polymers, particularly polyphenylene ethers, are capped by reaction with a chlorotriazine in the presence of a substantially inert organic liquid such as toluene, water, a phase transfer catalyst and a tertiary amine from a specific class, preferably a trialkylamine such as triethylamine or dimethyl-n-butylamine. The reaction proceeds rapidly and in good yield.

13 Claims, No Drawings

METHOD FOR PREPARING REACTIVE TRIAZINE-CAPPED AROMATIC POLYMERS, AND INTERMEDIATES FOR USE THEREIN

This application is a division of application Ser. No. 07/726,104, filed Jul. 5, 1991, now abandoned.

This invention relates to the preparation of reactively capped aromatic polymers, especially polyphenylene ethers. More particularly, it relates to an improved method for their preparation in a mixed aqueous-organic system.

There has been considerable interest in recent years in developing methods for insertion of reactive groups into polymers, in order to make them capable of forming copolymers with other polymers normally incompatible therewith. For example, normally incompatible blends of polyphenylene ethers with polyamides, polyesters or olefin polymers can be compatibilized by incorporation therein of a copolymer of the polyphenylene ether with the other polymer (in the case of olefin polymers, with a functionalized derivative thereof). Such copolymers may be formed by the reaction of groups in the other polymer such as carboxylic acid or amine groups with moieties reactive therewith in the polyphenylene ether.

Various patent applications disclose functionalized aromatic polymers capable of forming such copolymer-containing compositions. For example, copending, commonly owned application Ser. No. 07/351,905, now U.S. Pat. No. 5,096,979, describes the preparation of epoxytriazine-capped polyphenylene ethers by the reaction of a polyphenylene ether with an epoxy-substituted chlorotriazine. Said reaction may be conducted in a mixed aqueous-organic system using an inorganic base such as sodium hydroxide, or in a homogeneous organic system using an amine such as pyridine. A second copending, commonly owned application, Ser. No. 07/654,443, now U.S. Pat. No. 5,089,567 discloses similar capping reactions involving triazines containing reactive substituents such as alkyl groups substituted with halo or dialkylphosphato moieties.

The known methods for preparing these capped polymers, while effective, suffer from certain disadvantages. For example, the homogeneous method employing pyridine is accompanied by side reactions between by-product hydrogen chloride and epoxy groups or other acid-reactive groups, resulting in loss of at least a portion of the functionality.

In procedures utilizing an inorganic base such as sodium hydroxide, the capped product contains relatively high levels of residual sodium which may adversely effect the particle size of the product isolated from the capping reaction. When amines other than the relatively costly and toxic pyridine are employed, there is frequently a considerable decrease in yield of the capped polymer.

The present invention provides a method for introducing reactive triazine groups into hydroxy group-containing aromatic polymers in relatively high yield. Said method employs a mixed aqueous-organic system and at least one amine, which may be an amine which is readily available and relatively non-toxic. Also provided are certain novel quaternary ammonium salts of triazines, which appear to be the actual capping species employed in the method.

In one of its aspects, therefore, the invention is a method for preparing a reactive triazine-capped polymer which comprises intimately contacting, under reactive conditions, at least one hydroxy group-containing aromatic polymer with at least one chlorotriazine containing reactive groups in the presence of water, a substantially non-polar organic liquid, a reaction-promoting amount of a phase transfer catalyst and at least one tertiary amine selected from the group consisting of:

(A) nitrogen-heterocyclic aromatic and bicycloaliphatic amines;

(B) trialkylamines of the formula

wherein $R^1$ is an unsubstituted or substituted $C_{1-6}$ primary alkyl radical, $R^2$ is an unsubstituted or substituted $C_{1-10}$ alkyl radical and $R^3$ is an unsubstituted or substituted $C_{1-10}$ primary or secondary alkyl radical; and (C) heterocyclic amines of the formula

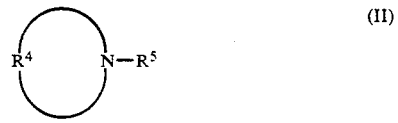

wherein $R^4$ is a divalent aliphatic hydrocarbon or aza- or oxahydro-carbon radical and $R^5$ is an unsubstituted or substituted $C_{1-6}$ primary or secondary alkyl radical;

the amount of water employed, based on aromatic polymer, being about 2–30% by weight.

The polymers which may be capped by the method of this invention include all aromatic polymers containing hydroxy groups. Said hydroxy groups may be present as end groups or as substituents on aromatic rings in the polymer chain or attached thereto. Thus, the term "capping" is employed in a very broad sense which includes reaction at positions along the polymer chain.

Suitable aromatic polymers include polyphenylene ethers and hydroxylated styrene polymers. The polyphenylene ethers, which are preferred, are known polymers comprising a plurality of structural units containing the formula

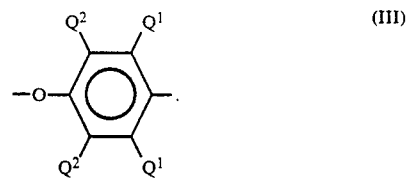

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine. The catalyst systems which are often preferred contain more than one amine, and at least one of said amines is usually dimethyl-n-butylamine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

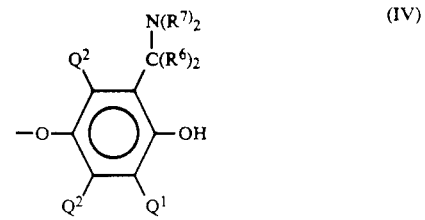

and

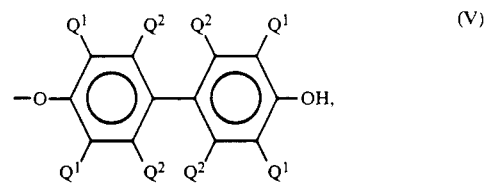

wherein $Q^1$ and $Q^2$ are as previously defined; each $R^6$ is independently hydrogen or alkyl, with the proviso that the total number of carbon atoms in both $R^6$ radicals is 6 or less; and each $R^7$ is independently hydrogen or a $C_{1-6}$ primary alkyl radical. Preferably, each $R^6$ is hydrogen and each $R^7$ is alkyl, especially methyl or n-butyl.

Polymers containing the aminoalkyl-substituted end groups of formula IV may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy groups on the terminal unit of the polymer chain. During further processing and/or blending, the aminoalkyl-substituted end groups may undergo various reactions, probably involving a quinone methide-type intermediate of the formula

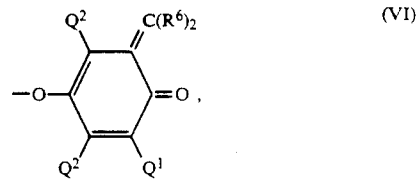

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula V are typically obtained from reaction mixtures in which a by-product diphenoquinone of the formula

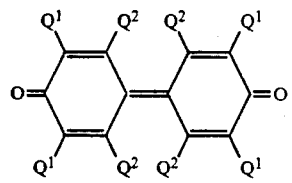 (VII)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas IV and V. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

A wide variety of chlorotriazines containing reactive groups may be employed in the method of the invention. They include compounds of the formula

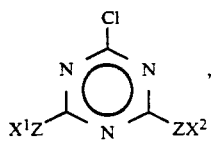 (VIII)

wherein $X^1$ is alkyl, cycloalkyl or an aromatic radical, $X^2$ is an aromatic radical or $R^8$—$X^3$, $R^8$ is a $C_{1-4}$ alkylene radical which is unsubstituted or contains substituents inert to displacement by nucleophilic moieties, $X^3$ is a group capable of reaction with nucleophilic moieties and Z is oxygen or sulfur. Most often, $X^2$ is a glycidyl group or a group having the formula

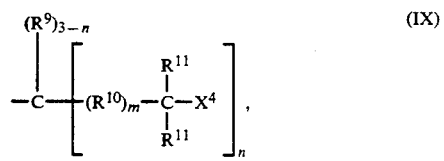 (IX)

wherein $X^4$ is a group displaceable by nucleophilic substitution, most often chlorine, bromine or dialkylphosphato; each $R^9$ is independently hydrogen, $C_{1-4}$ primary or secondary alkyl or a non-hydrocarbon substituent substantially inert to displacement by nucleophilic moieties; $R^{10}$ is a $C_{1-3}$ alkylene radical which is unsubstituted or is substituted with moieties selected from the group consisting of $C_{1-4}$ primary and secondary alkyl radicals and non-hydrocarbon substituents as defined for $R^9$; each $R^{11}$ is independently $R^9$ or $X^4$; m is 0 or 1 and n is 1-3. Still more preferably, $X^4$ has the formula

 (X)

wherein Z is as previously defined and each $R^{12}$ is a $C_{1-30}$ primary or secondary alkyl, cycloalkyl, aromatic or aralkyl radical or both $R^{12}$ radicals together with the P and Z atoms form a cyclic structure.

Illustrative of the chlorotriazines which may be employed in the present invention are:

2-chloro-4,6-diphenoxytriazine,
2-chloro-4,6-bis(2,4,6-trimethylphenoxy)triazine,
2-chloro-4,6-diglycidoxy-1,3,5-triazine,
2-chloro-4-(n-butoxy)-6-glycidoxy-1,3,5-triazine,
2-chloro-4-(2,4,6-trimethylphenoxy)-6-glycidoxy-1,3,5-triazine (hereinafter "MGCC"),
2-chloro-4-(2-chloroethoxy)-6-(2,4,6-trimethylphenoxy)-1,3,5-triazine,
2-chloro-4-(2-bromoethoxy)-6-(2,4,6-trimethylphenoxy)-1,3,5-triazine,
2-chloro-4-(2-diethylphosphatoethoxy)-6-(2,4,6-trimethylphenoxy)-1,3,5-triazine,
2-chloro-4-(2-di-n-butylphosphatoethoxy)-6-(2,4,6-trimethylphenoxy)-1,3,5-triazine (hereinafter "PMCC"), and
2-chloro-4-(2-di-n-butylphosphatoethoxy)-6-(2,6-xylenoxy)-1,3,5-triazine.

Such compounds may be prepared by the reaction of cyanuric chloride (i.e., 2,4,6-trichlorotriazine) with the hydroxy or thio compound(s) corresponding to the substituent(s) on the heterocyclic ring.

Also employed in the method of this invention are water, a substantially non-polar organic liquid and a phase transfer catalyst. Suitable organic liquids include chlorinated aliphatic hydrocarbons such as methylene chloride and chloroform (although methylene chloride should not be used with polyphenylene ethers since it forms a complex therewith); aromatic hydrocarbons such as toluene and xylene; and chlorinated aromatic hydrocarbons such as chlorobenzene and o-dichlorobenzene. The aromatic hydrocarbons and especially toluene are usually preferred.

Any phase transfer catalyst which is stable and effective under the prevailing reaction conditions may be used; those skilled in the art will readily perceive which ones are suitable. Particularly preferred are the tetraalkylammonium chlorides wherein at least two alkyl groups per molecule, preferably two or three, contain about 4-20 carbon atoms.

The final reagent employed in the method is at least one tertiary amine. The useful amines fall into three classes, class A consisting of nitrogen-heterocyclic aromatic and bicycloaliphatic amines such as pyridine, 4-dimethylaminopyridine, N-methylpyrrole, N-ethylpyrrole, quinoline, isoquinoline, N-methylimidazole, indole, 1,5-diazabicyclo[4.3.0]non-5-ene and 1,8-diazabicyclo[5.4.0]undec-7-ene.

Class B consists of aliphatic amines of formula I, in which $R^{1-3}$ are as previously defined. In the preferred amines of this type, all of $R^{1-3}$ are primary alkyl radicals. Illustrative amines within this class are dimethyl-n-butylamine, methyl-di-n-octylamine and triethylamine.

Class C consists of heterocyclic amines of formula II, in which $R^4$ is a divalent aliphatic hydrocarbon radical or aza- or oxohydrocarbon radical and $R^5$ is a radical of the type previously defined for $R^3$. Such amines include N-methylpiperidine, N-methylmorpholine, N,N'-dimethylpiperazine, N-methylpyrrolidine and the like. The tertiary amines which are frequently preferred for use in the invention are those of class B. They include trimethylamine, triethylamine, tri-n-butylamine, di-n-butylmethylamine, diiso-propylethylamine, dimethyl-n-butylamine (hereinafter "DMBA"), tetraethylethylenediamine, triethanolamine and dimethylethanolamine. Particularly preferred, by reason of its availability and particular effectiveness, is DMBA. As discussed hereinabove, it is frequently present in catalysts for the preparation of polyphenylene ethers by oxidative coupling of hydroxyaromatic compounds such as 2,6-xylenol, and it usually remains in the polyphenylene ether after preparation.

The method of this invention requires intimate contact, most often involving vigorous stirring or other agitation, between the aromatic polymer, chlorotriazine and other reagents under reactive conditions. Such conditions usually include temperatures in the range of about 20°–100° and preferably about 40°–80° C., and the employment of about 0.5–2.0% by weight phase transfer catalyst, based on aromatic polymer.

Water is employed in the amount of about 2–30% and preferably about 5–25% by weight, based on aromatic polymer. The amount of organic liquid is not critical but is most often about 2–3 ml. per gram of aromatic polymer.

The ratio of equivalents of chlorotriazine to polyphenylene ether (based on non-hydrogen bonded hydroxy groups in the polyphenylene ether) is at least about 1.5:1. Of course, it may sometimes be advantageous to employ higher proportions of chlorotriazine (e.g, ratios up to about 4.25:1) in order to maximize the yield of the capped product.

The proportion of amine employed is generally about 1.5–3.5 equivalents per equivalent of aromatic polymer. (For the purposes of this invention, the equivalent weight of an amine is its molecular weight divided by the number of amino nitrogen atoms therein, except in the case of 4-dimethylaminopyridine and analogous compounds which behave chemically as though only one amino group is present.) As previously noted, some of said amine as well as some water is frequently present in the polymer as a result of its preparation. When this is the case, it is only necessary to add further water and/or amine and/or phase transfer catalyst in the amount necessary to bring the total content thereof to the desired level. The method of the invention is particularly advantageous by reason of its employment of amines in routine use in the preparation of polyphenylene ethers.

Under the preferred conditions described hereinabove, capping of the aromatic polymer is frequently very fast. It often reaches completion in the time required to mix the reactants. This is particularly true when a polyphenylene ether is being capped.

It is believed that the advantageous results afforded by the method of this invention are attributable to a reaction of the chlorotriazine with the tertiary amine to form a triazine-substituted quaternary ammonium chloride, which is thought to be an essential intermediate in the capping process described herein. Evidence for the formation of such a salt includes the disappearance of MGCC from the liquid chromatograph of the product obtained by treating MGCC with DMBA in toluene solution in the absence of water.

Addition of said solution to a solution of sodium salt of polyphenylene ether and phase transfer catalyst in toluene does not, however, afford the desired capped polyphenylene ether. It is believed that this is the result of dealkylation of the quaternary ammonium salt, with loss of an alkyl group to form a tertiary amine, prior to reaction of the triazine moiety thereon with the polyphenylene ether salt. When water is present, a substantial proportion of the quaternary ammonium salt apparently migrates to the aqueous phase before dealkylation can occur, and is available for use in the capping process.

This hypothesis also explains the effectiveness of the capping reaction in an all-organic medium when pyridine is employed as the amine. The resulting quaternary ammonium salt contains no alkyl groups (the amine nitrogen atom being part of an aromatic ring system) and thus cannot be dealkylated. It is not necessary, therefore, for water to be present to suppress dealkylation in such instances, although the presence of water may be advantageous.

Another aspect of the present invention, therefore, is quaternary ammonium halides of the type which are believed to serve as capping agents in the method of the invention. Such quaternary ammonium chlorides may be represented by a formula selected from the group consisting of

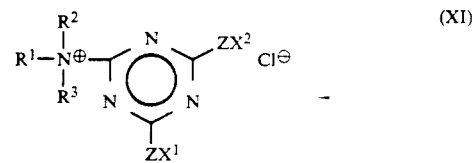

and

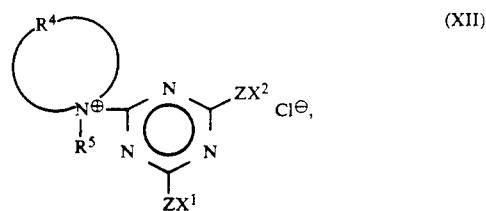

wherein $R^{1-5}$, $X^{1-2}$ and Z are as previously defined.

The invention is illustrated by the following examples. The polyphenylene ether employed in the examples (designated "PPE") was a commercially available poly(2,6-dimethyl-1,4-phenylene ether); unless otherwise specified, it had an intrinsic viscosity of 0.40 in chloroform at 25° and 0.1% non-hydrogen bonded hydroxy end groups; the phase transfer catalyst was a commercially available methyltrialkylammonium chloride in which the alkyl groups contained 8–10 carbon atoms. Percentages of capped PPE were determined by Fourier transform infrared (FTIR) and/or proton nuclear magnetic resonance (NMR) spectroscopy. All percentages are by weight.

EXAMPLES 1-4

Solutions of various amounts of DMBA in 50 ml. of toluene were combined with water (41 grams in Examples 1-3, 82 grams in Example 4) and various amounts of MGCC, the latter being added as a 0.96M solution in toluene. The resulting mixtures were stirred vigorously for 2 minutes and were then added at 70°-75° C., in a nitrogen atmosphere, to solutions in toluene of 200 grams (11.8 mmol.) of PPE and 2 grams of phase transfer catalyst. The mixtures were vigorously stirred for 1 hour, after which the polymers were precipitated with methanol, filtered and dried.

The results are given in Table I, in comparison with various controls. In Control 1, no water or phase transfer catalyst was employed; in Controls 2-4, no water was employed; and in Control 5, 41 grams of water but no phase transfer catalyst was present.

TABLE I

| Example | Toluene in PPE soln., ml. | Ratio of equivs. MGCC:PPE | Ratio of equivs. DMBA:PPE | Percent capped (NMR) |
|---|---|---|---|---|
| 1 | 1000 | 1.85 | 1.45 | 52 |
| 2 | 550 | 2.04 | 3.0 | 76 |
| 3 | " | " | " | 81 |
| 4 | " | " | " . | 71 |
| Control 1 | " | 2.04 | 1.5 | 10 |
| Control 2 | " | 2.04 | 1.5 | 7 |
| Control 3 | " | 2.04 | 3.0 | 6 |
| Control 4 | " | 4.08 | 3.0 | 18 |
| Control 5 | " | 2.04 | 1.5 | 10 |

It is apparent that the degree of capping is substantially higher according to the method of this invention than when no water and/or no phase transfer catalyst is employed.

EXAMPLES 5-16

The procedure of Example 2 was repeated, substituting various amines for the DMBA in a ratio of equivalents to PPE of 2:1. The percentages of capped polymer are listed in Table II.

TABLE II

| Example | Amine | Percent capped (NMR) |
|---|---|---|
| 5 | Trimethylamine | 69 |
| 6 | Triethylamine | 63 |
| 7 | Tri-n-butylamine | 20 |
| 8 | Diisopropylethylamine | 26 |
| 9 | Di-n-butylmethylamine | 66 |
| 10 | Tetraethylethylenediamine | 65 |
| 11 | Triethanolamine | 37 |
| 12 | Dimethylethanolamine | 35 |
| 13 | Pyridine | 52 |
| 14 | 4-Dimethylaminopyridine | 58 |
| 15 | N-Methylimidazole | 47 |
| 16 | N-Methylmorpholine | 66 |

EXAMPLE 17

The procedure of Examples 5-16 was repeated, employing DMBA as the amine and substituting 2-chloro-4,6-diphenoxytriazine for the MGCC. The product was 72% capped (FTIR).

EXAMPLE 18

The procedure of Examples 5-16 was repeated, employing DMBA as the amine and substituting 2-chloro-4,6-bis(2,4,6-trimethylphenoxy)triazine for the MGCC. The product was 92% capped (FTIR).

EXAMPLE 19

A solution of 200 grams of PPE and 2 grams of phase transfer catalyst in 962 ml. of toluene was combined with 77 grams of water and PMCC in a ratio of equivalents to PPE of 2:1. DMBA was added at 70°-75° C. in a ratio of equivalents to PPE of 2:1, and the mixture was stirred under nitrogen for 30 minutes. The product was isolated as described in Example 1; percent capping was 82% (FTIR) and 90% (NMR).

EXAMPLE 20

The procedure of Example 19 was repeated, employing a ratio of equivalents of PMCC to PPE of 1.5:1. Percent capping was 73% (FTIR) and 77% (NMR).

EXAMPLE 21

The procedure of Example 1 was repeated except that 100 grams of PPE, 400 ml. of toluene, 0.5 gram of phase transfer catalyst, 37 grams of water and DMBA in a ratio of equivalents to PPE of 2:1 were employed, and the MGCC was replaced by PMCC in a ratio of equivalents to PPE of 2:1. The percent capping was 90% (NMR).

EXAMPLE 22

The PPE employed was in the form of a stream obtained directly from the synthesis facility as a solution in toluene containing 29.3% solids (i.e., PPE), 4.1% water, 0.32% DMBA and about 0.1% phase transfer catalyst. A portion thereof containing 125 grams of PPE was combined at 75° C. with 1.25 grams of additional phase transfer catalyst, 35 grams of additional water and MGCC in a ratio of equivalents to PPE of 2:1. The mixture was stirred for 30 minutes and worked up as described in Example 1. The percent capping was 89% (FTIR) and 61% (NMR).

EXAMPLE 23

The procedure of Example 22 was repeated, except that no additional water and phase transfer catalyst were added. The percent capping was 49% (FTIR) and 26% (NMR).

EXAMPLE 24

A PPE synthesis stream was employed which contained 35% solids (PPE having an intrinsic viscosity of 0.37 and having 0.09% non-hydrogen bonded hydroxy end groups), 3.9% water, 0.35% DMBA and about 0.1% phase transfer catalyst. A portion thereof containing 355.6 grams of PPE was combined at 70° C. with 1.78 grams of additional phase transfer catalyst, 61 ml. of additional water and PMCC in a ratio of equivalents to PPE of 1.85:1. Upon workup as in Example 1, a product was obtained in which the percent capping was 73% (FTIR) and 80% (NMR).

EXAMPLE 25

There were combined, at 65° C., 51.43 kg. of the synthesis stream of Example 24, 0.18 kg. of phase transfer catalyst, 3.3 liters of water and an additional 14 grams of DMBA. The mixture was stirred for 30 minutes and there was added 3.693 liters of a 0.52M solution of PMCC in toluene. Samples were taken for analysis at 1 minute, 20 minutes, 40 minutes and 1 hour. After 1 hour of stirring, the product was worked up as in Example 1 and was shown to be 98% capped (NMR). The percentage capping after 1 minute was 91%, and after 20 minutes was 96%.

EXAMPLE 26

A procedure similar to that of Example 25 was employed, except that all the DMBA was replaced by methyldi-n-octylamine. The approximate percentage capping after 45 minutes was 33%. In a similar experiment employing tri-n-octylamine, no capping was observed.

What is claimed is:

1. A method for preparing a reactive triazine-capped polymer which comprises contacting, under reactive conditions, at least one hydroxy group-containing aromatic polymer with at least one chlorotriazine containing reactive groups in the presence of water, a substantially non-polar organic liquid, a reaction-promoting amount of a phase transfer catalyst and at least one tertiary amine selected from the group consisting of:

(A) nitrogen-heterocyclic aromatic and bicycloaliphatic amines;

(B) trialkylamines of the formula

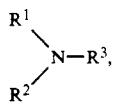

wherein $R^1$ is an unsubstituted or substituted $C_{1-6}$ primary alkyl radical, $R^2$ is an unsubstituted or substituted $C_{1-10}$ alkyl radical and $R^3$ is an unsubstituted or substituted $C_{1-10}$ primary or secondary alkyl radical; and (C) heterocyclic amines of the formula

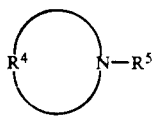

wherein $R^4$ is a divalent aliphatic hydrocarbon or aza- or oxahydrocarbon radical and $R^5$ is an unsubstituted or substituted $C_{1-6}$ primary or secondary alkyl radical;

the amount of water, based on aromatic polymer, being about 2-30% by weight.

2. A method according to claim 1 wherein the chlorotriazine has the formula

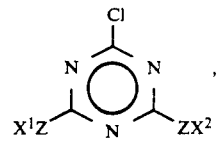

wherein $X^1$ is alkyl, cycloalkyl or an aromatic radical, $X^2$ is an aromatic radical or $R^8$—$X^3$, $R^8$ is a $C_{1-4}$ alkylene radical which is unsubstituted or contains substituents inert to displacement by nucleophilic moieties, $X^3$ is a group capable of reaction with nucleophilic moieties and Z is oxygen or sulfur.

3. A method according to claim 2 wherein the amine is a trialkylamine of formula I.

4. A method according to claim 3 wherein the organic liquid is an aromatic hydrocarbon.

5. A method according to claim 4 wherein the phase transfer catalyst is a tetraalkylammonium chloride wherein at least two alkyl groups per molecule contain about 4-20 carbon atoms.

6. A method according to claim 4 wherein the contacting temperature is in the range of about 20°-100° C.

7. A method according to claim 6 wherein the proportion of amine is about 1.5-3.5 equivalents per equivalent of aromatic polymer.

8. A method according to claim 6 wherein the proportion of chlorotriazine is about 1.5-4.25 equivalents per equivalent of aromatic polymer.

9. A method according to claim 7 wherein Z is oxygen, $X^1$ is an aromatic radical and $X^2$ is a glycidyl group or a group having the formula

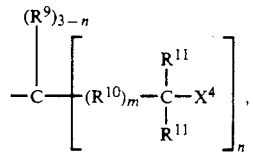

wherein $X^4$ is a group displaceable by nucleophilic substitution; each $R^9$ is independently hydrogen, $C_{1-4}$ primary or secondary alkyl or a non-hydrocarbon substituent substantially inert to displacement by nucleophilic moieties; $R^{10}$ is a $C_{1-3}$ alkylene radical which is unsubstituted or is substituted with moieties selected from the group consisting of $C_{1-4}$ primary and secondary alkyl radicals and non-hydrocarbon substituents as defined for $R^9$; each $R^{11}$ is independently $R^9$ or $X^4$; m is 0 or 1 and n is 1-3.

10. A method according to claim 8 wherein the chlorotriazine is 2-chloro-4-(2,4,6-trimethylphenoxy)-6-glycidoxy-1,3,5-triazine, 2-chloro-4-(2,6-xylenoxy)-6-glycidoxy-1,3,5-triazine, 2-chloro-4-(2-diethylphosphatoethoxy)-6-(2,4,6-trimethylphenoxy)-1,3,5-triazine, 2-chloro-4-(2-di-n-butylphosphatoethoxy)-6-(2,4,6-trimethylphenoxy)-1,3,5-triazine or 2-chloro-4-(2-di-n-butylphosphatoethoxy)-6-(2,6-xylenoxy)-1,3,5-triazine.

11. A method according to claim 10 wherein the aromatic polymer is a polyphenylene ether.

12. A method according to claim 11 wherein the amine is dimethyl-n-butylamine.

13. A method according to claim 12 wherein the polyphenylene ether is a poly(2,6-dimethyl-1,4-phenylene ether).

* * * * *